United States Patent [19]

Ikushima et al.

[11] 4,393,400
[45] Jul. 12, 1983

[54] 3-D TV SYSTEMS

[75] Inventors: Hiroshi Ikushima, Hirakata; Takaaki Baba, Nishinomiya; Takayuki Sagishima, Suita; Masanobu Tanaka, Hirakata, all of Japan

[73] Assignee: Matsushita Electric Industrial Co., Ltd., Osaka, Japan

[21] Appl. No.: 267,520

[22] Filed: May 27, 1981

[30] Foreign Application Priority Data

May 29, 1980 [JP] Japan .................................. 55-72267

[51] Int. Cl.³ .............................................. H04N 9/58
[52] U.S. Cl. ...................................... 358/92; 358/138
[58] Field of Search ..................... 358/88, 91, 92, 138

[56] References Cited

U.S. PATENT DOCUMENTS 3,737,567 6/1973 Kratomi ................................. 358/92
4,006,291 2/1977 Imsand ................................. 358/92

Primary Examiner—Howard Britton
Attorney, Agent, or Firm—Wenderoth, Lind & Ponack

[57] ABSTRACT

A flickerless 3-D TV viewing system is designed to be used with a single TV receiver set and with a set of stereoscopic glasses composed of light shutters.

The system includes a signal-distributor, a set of memory devices, a signal-selector, a synchronous signal separator, a discriminator and a timing circuit. The system is very comfortable for the user during 3-D TV viewing.

3 Claims, 5 Drawing Figures

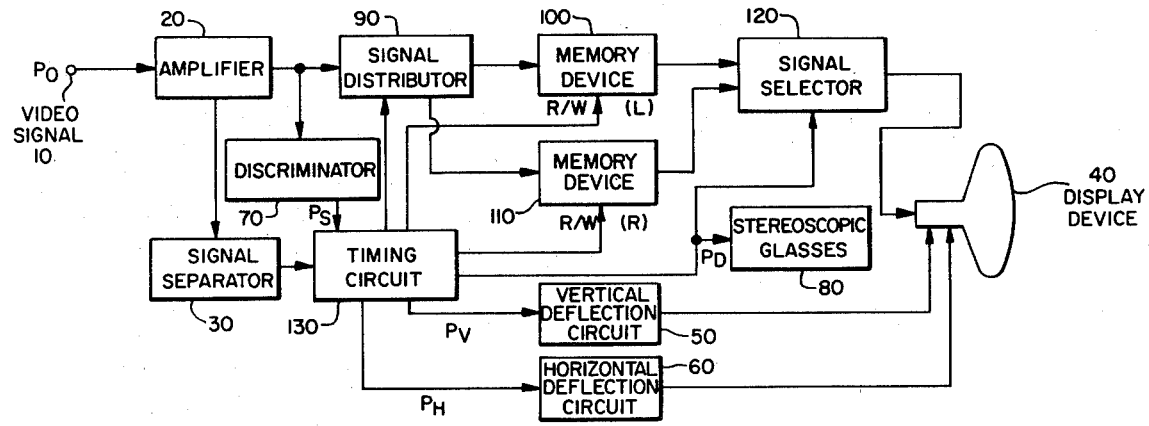

3-D TV SYSTEMS

BACKGROUND OF THE INVENTION

This invention relates to a 3-D TV image viewing system, and mainly to system for viewing 3-D TV images of a high quality by eliminating a flicker.

Flicker has been caused by the light shutters used in conventional 3-D TV systems, in which the shutter period of the light shutters is synchronized with the display period of the TV images to obtain a fused stereoscopic image consisting of both the left image and the right image corresponding to the human eyes. In the prior art system, the left and right images are picked up alternatingly by each field. In the conventional TV systems, the switching periods ($T_v$) are defined as follows: about 1/60 of a second in the NTSC system adopted in both Japan and the U.S.A., and about 1/50 of a second in the PAL system adopted in both G.B. and W.G. and in the SECAM system adopted in France and the U.S.S.R. The time period for fusing the left and the right image fields into a single stereoscopic frame is twice the switching period ($2T_v$). The value for fusing is above the threshold value ($\approx 1/45$ of a second) for the human eye to be sensitive to flicker. In practice, during the 3-D TV viewing of the video signals from an image recording apparatus, for example-a VTR, the flicker effect causes human eyes to feel a slight fatigue.

SUMMARY OF THE INVENTION

It is an object of this invention to overcome the above problem of the prior art and to provide an improved 3-D TV viewing system which is simple in construction and which can produce flickerless stereoscopic images.

BRIEF DESCRIPTION OF THE DRAWINGS

Other objects and features of the present invention will become apparent from the following description taken together with the accompanying drawings, wherein.

DESCRIPTION OF THE PREFERRED EMBODIMENT

Figure 1:
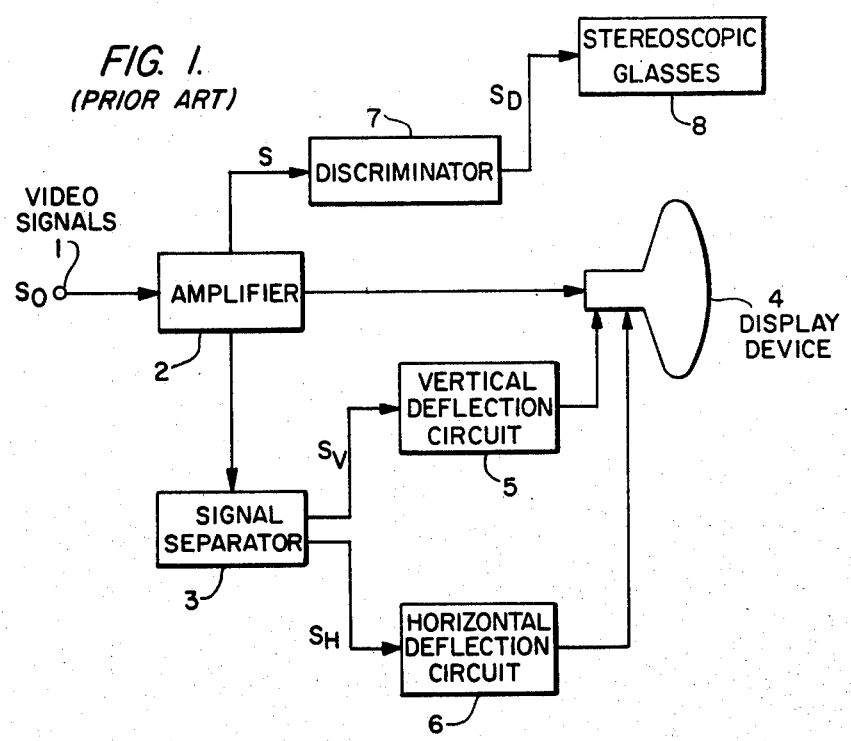
FIG. 1 is a block diagram of the construction of a 3-D TV viewing system according to prior art.

Referring now to FIG. 1, reference numeral 1 designates video signals ($S_O$) transmitted from such image signal supplying apparatus as TVs or VTRs. The signals ($S_O$) corresponding to a left and a right image are time-sequentially transmitted by each field. Amplifier 2 amplifies the abovenoted signal levels. A synchronizing signal separator 3 is necessary for synchronously dividing the signal $S_O$ into vertical display and horizontal display signals. Reference numeral 4 designates a single display device wherein the Braun tube is merely representative of various possible display devices such as: liquid crystals, electro-luminescent body, fluro-luminescent body and solid-state electro-optical effect elements. Reference numerals 5 and 6 designate the deflecting circuits which display the synchronously separated signals $S_v$ and $S_H$, respectively transmitted from the abovenoted synchronizing signal separator 3 in the vertical direction and in the horizontal direction; herein suffixes V and H respectively denote the vertical and horizontal direction. A discriminator 7 identifies the left or right image signal from the image signal (S) which comprises both left and right image signals alternatingly inputted in time-sequence. Reference numeral 8 designates stereoscopic glasses comprising a light-shutter to provide the human eyes with a transparent and an opaque view-field which is synchronous with the displaying period in the display device according to the abovenoted discriminating signal. The symbol $S_D$ denotes a signal for driving the stereoscopic glasses so as to operate as a light shutter. The glasses also contain a power-supply to drive their light shutters.

Figure 2:
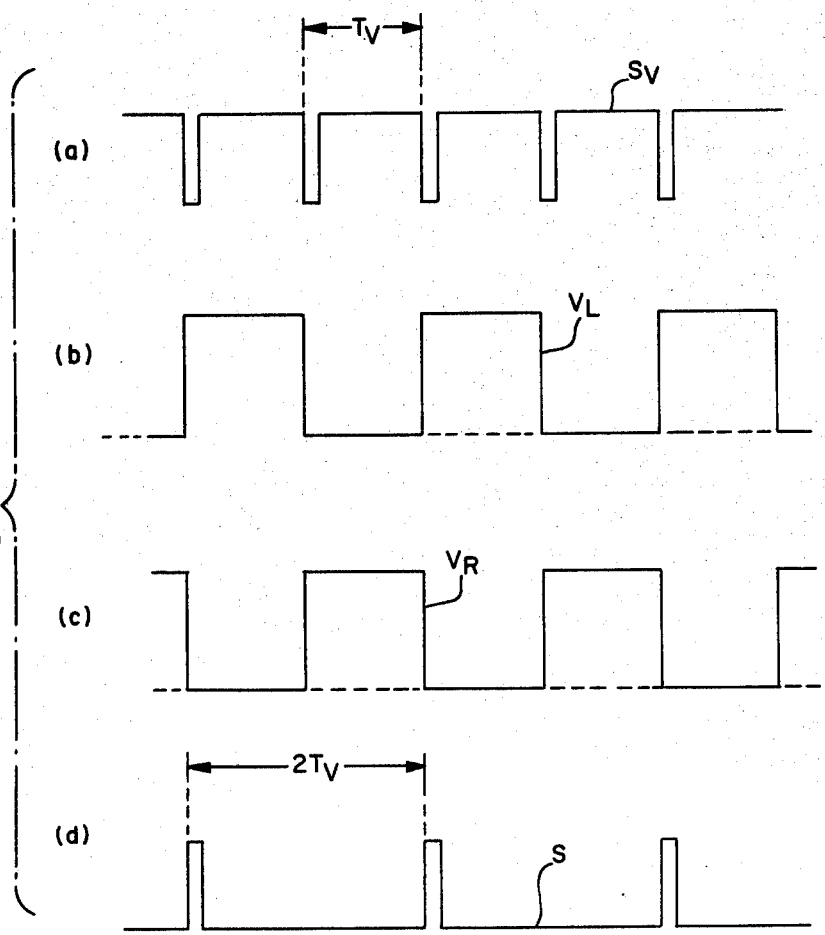
FIG. 2 is a timing chart showing the electrical signals appearing in the system according to prior art.

Referring now to FIG. 2, notation $S_v$ of FIG. 2($a$) denotes the vertical synchronizing pulse whose period is $T_v$. The value of $T_v$ is the same as that of the abovementioned image switching period. Notation $V_L$ and $V_R$ denote a representative pattern of voltage to be respectively supplied to the left and right hand light shutters which are essential components of the stereoscopic glasses. The suffixes L and R respectively show the left- and right-hand-sides. When a voltage is applied to the light shutter, it is conventionally open and passes light therethrough while supplied with the voltage $V_L$ or $V_R$, whereas the other shutter is sumultaneously closed and the view-field dark. In other words, the signal in FIG. 2 ($b$) or ($c$) designates the display signal series composed of left and right images. The signal S in FIG. 2 ($d$) explains the period for fusing both left and right into a single stereoscopic image. Namely, the above period is twice that for exchanging the above left and right images with each other and approximates the threshold value (1/45 sec) wherein human eyes sense flicker in conventional 3-D TV systems.

Figure 3:
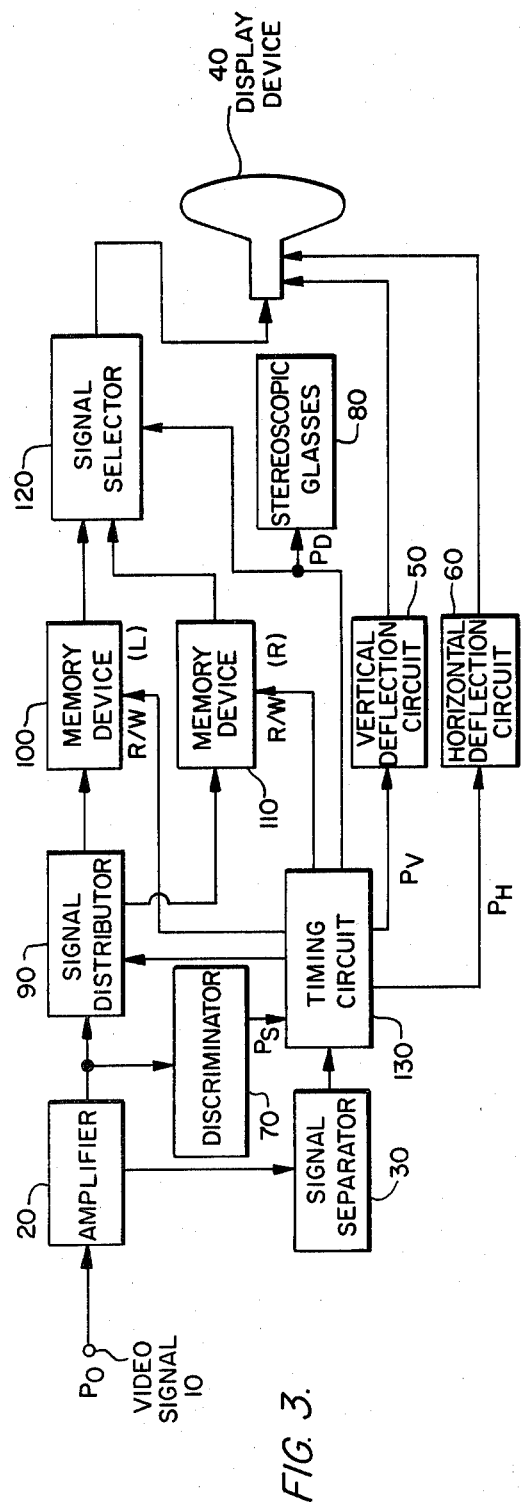
FIG. 3 is a block diagram of one of the possible constructions of a 3-D TV viewing system embodying this invention.

Now, referring to FIG. 3, which is an embodiment of this invention, reference numerals 10~40 correspond to the reference numerals 1~4 shown in FIG. 1; wherein they respectively denote a video signal ($P_0$), an amplifier, a synchronizing separator and display device. The display device 40 may also include an amplifier. Reference numerals 50 and 60 respectively designate a vertical and a horizontal deflection circuit having a deflecting frequency whose value is the present frequency value multiplied by an integral number (m). Signals $P_v$ and $P_H$ respectively denote signals corresponding to $S_v$ and $S_H$ in FIG. 1. Reference numerals 70 and 80 also designate the same discriminator and stereoscopic glasses as those denoted by reference numerals 7 and 8 in FIG. 1. Stereoscopic glasses 80, however, give human eyes an open and a closed view-field in one m-th of the light-shutter switching period according to prior art. Reference numeral 90 designates a signal distributor for discerning and distributing the abovenoted left and right image signals by each field whose period has the same value that an image pickup device has. Reference numerals 100 and 110 both respectively designate a kind of memory device wherein a left and a right image signal distributed from the distributor 90 are written into and stored and whose stored signals are repeatedly read out in correspondance with requests by each field. A random-access-memory (RAM) is conventionally used as the memory device. Notation R/W denotes reading out and writing in. The letters L and R respectively denote left and right. Signal selector 120 selects the left or right image signal from the composite signal transmitted from the memory devices 100 and 110 wherein a selecting frequency has the conventional value multiplied by m. Reference numeral 130 designates a kind of timing circuit wherein the synchronized separated signal inputted from the signal separator 30 and the discriminating signal $P_s$ transmitted from the discriminator 70 multiply the sweeping frequencies in the vertical deflecting circuit 50 and horizontal deflecting circuit 60, wherein the trigger signal whose frequency is the same as that of the discriminating signal is sent to the said signal distributor 90 and the memory devices 100 and 110 corresponding to the left direction and the right direction images, and wherein the trigger signal having a period which is one m-th of the period of the image pickup is transmitted to the said signal selector 120 and to the stereoscopic glasses 80. The essential function of the circuit 130 is to give the necessary timing to each circuit mentioned above and the circuit is easily constructed from usual circuits and components. In the 3-D TV viewing system embodying this invention, as shown in FIG. 3, the frequency for changing over a left and a right image display is increased by multiplying the conventional frequency by an integer m whereby the stereoscopic viewing time to fuse the left direction and the right direction images into a single image frame is shortened to one m-th of the usual fusing time. The value of the fusing time is short enough so that the human eye senses no flicker. The foregoing effect is realized by shortening each image display period to one m-th of the conventional period and by compensating for the shortage of the image information in time-sequence as time goes on by repeatedly displaying the same image m times using the memory devices 100 and 110. The number m that appears in this specification is a positive integer which is greater than 1. Notations $P_O$, $P_s(P_s')$ and $P_D$ respectively denote a video signal, the composite signal composed of a left and a right image signal and the signal driving stereoscopic glasses 80 as a light shutter. The signal $P_s'$ has the same frequency that the signal $P_s$ has, but is marked with a prime so as to take into account of the fact that the level of $P_s'$ may be different from that of $P_s$ when it passes through the abovenoted timing circuit 130. The frequency of the signal $P_D$ is m times that of the signal $S_D$.

Figure 4:
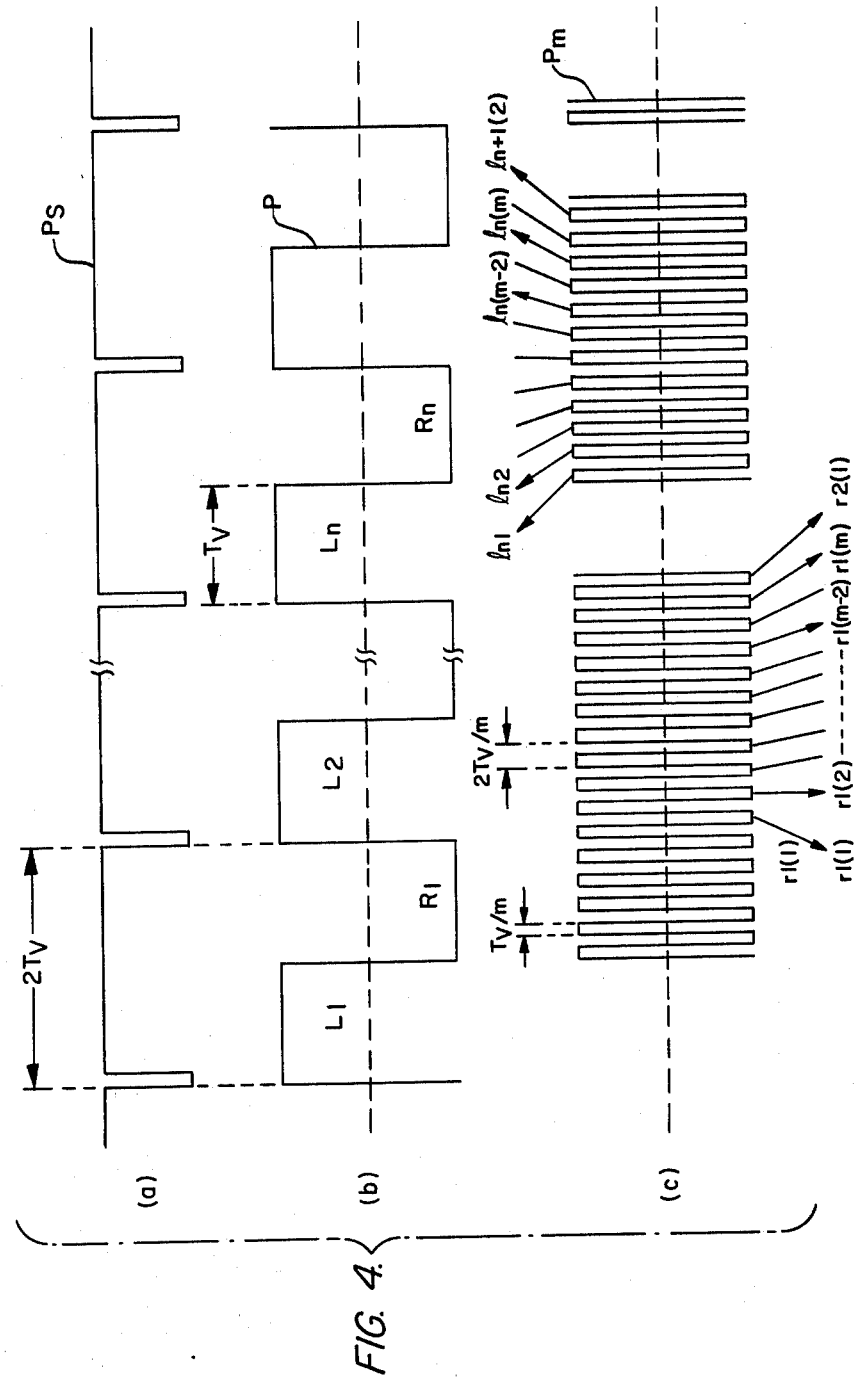
FIG. 4 is a timing chart showing the electrical signals appearing in the system embodying this invention.

In order to explain the fundamental difference in function between the 3-D TV system embodying this invention as illustrated in FIG. 3 and that system according to the prior art, the relationship between a pickup image signal and a display image signal is described in time-sequence as illustrated in FIG. 4. FIG. 4 (a) shows a series of pulse signals discriminating each image from the other of the composite image signals composed of the above left and right image signals wherein notation $2T_v$ denotes the time period for picking up each image. FIG. 4 (b) corresponds to a series of image signals picked up from the left and the right direction in the abovenoted period ($2T_v$) wherein letters L and R mean left or right in each, wherein the suffixes (1, ..., n) correspond to the number of each field of both direction images and wherein notation P denotes the signal $P_O$ or the signal passed through the amplifier 20 as described in FIG. 3. Notation $T_v$ in the above mentioned Figure denotes the same meaning as the notation $T_v$ does in FIGS. 1 and 2. Namely, it denotes the changing period of the left and the right image signals in the case of image picking-up common to the prior art and to this invention, and it simultaneously corresponds to the sweeping period in the vertical deflection circuit for the image display in the conventional case. Notation $P_m$ in FIG. 4 (c) denotes an example of an image display in the system embodying this invention wherein the same image is repeatedly displayed m times with a signal series in timesequence for driving the light shutter in the stereoscopic glasses 80 in FIG. 3. The letters l and r in FIG. 4 (c) respectively correspond to the letters L and R in FIG. 4 (b), and hence the following formulae are derived:

$$mL_n = \sum_{i=1}^{m} l_{n(i)}, \; mR_n = \sum_{j=1}^{m} r_{n(j)} \tag{1}$$

$$\delta_{pq}\{l_{p(i)} - l_{q(j)}\} = 0, \; \delta_{pq}\{r_{p(i)} - r_{q(j)}\} = 0 \tag{2}$$

$$\delta_{pq} \neq 0 (p=q), \; =\delta_{pq}=0 \; (p \neq q) \tag{3}$$

Notation $T_v/m$ in FIG. 4 (c) denotes the sweeping period of an image display in the vertical deflection circuit and the display-changing period of the left and the right images in the above mentioned 3-D TV system embodying this invention. The time $2T_v/m$ therefore becomes a time for fusing a left and a right image into a single stereoscopic image in the system embodying this invention. The time period which is below about half the time needed for the human eye to sense a flicker as already mentioned above, is short enough practically to obtain a stereoscopic view and corresponds to the case $m=2$ in FIG. 4 (c). The relationship between the electrical signals used for displaying the images in that case ($m=2$) is concretely shown in FIG. 5 as suggested from FIG. 4.

Figure 5:
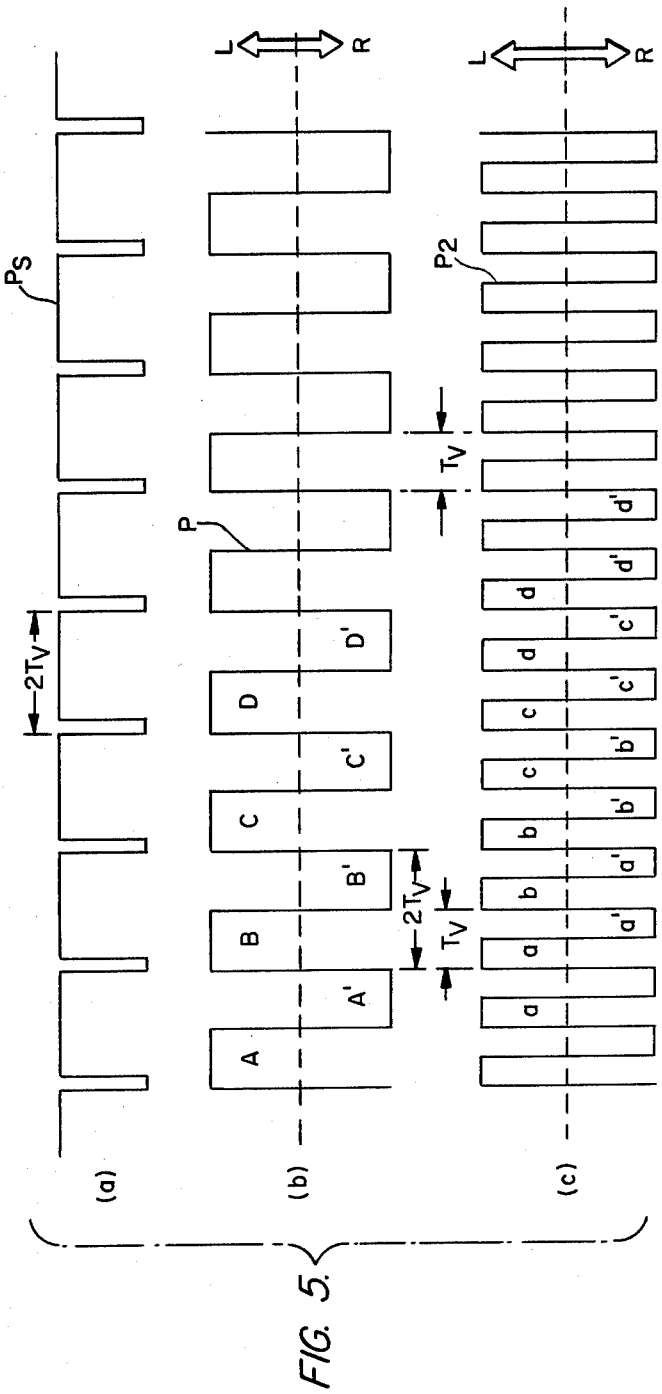
FIG. 5 is a timing chart showing the electrical signals appearing in another example of the system in accordance with this invention.

In FIG. 5, the following relationships hold:

$$A=a, \ldots, D=d; A'=a' \ldots, D'=d'$$

followed by similar equations. Notation $P_2$ corresponds to the case of $m=2$ in $P_m$ shown in FIG. 4. Other notations in FIG. 5 denote meanings similar to those in FIG. 4.

The characteristics of a 3-D TV system embodying this invention are summarized as follows: (concerning the time-sequential display of images) the left and the right image corresponding to the same single object seen by human eyes are stored by each field separatedly (the left field separately from the right one) and they are repeatedly displayed many times according to the necessities of viewing. Therefore, the function and the construction of the above mentioned memory devices are arbitrary in so far as they serve the above described fundamental function, for instance, each memory device (one for the left image, the other for the right image) may be constructed so as to consist of two devices whose functions are independent of each other: one device is exclusively used for storing an image signal corresponding to each field signal in conventional TV systems in a time period of said switching periods (Tv) and the other device is exclusively used for repeatedly sending out the stored image signal m times during the period of Tv/m.

Hence, a 3-D TV system embodying this invention is capable of stereoscopically viewing a left and a right direction image corresponding to an image of an object as seen by human eyes, which is picked up by the conventional or prior art TV image-pick-up method with no flicker and is capable of storing a left and a right image corresponding to a single object separately by each field so as to repeatedly display same many times according to viewing necessity. The system embodying this invention enables human eyes to feel no fatigue but rather to be comfortable during 3-D TV viewing.

What we claim is:

1. A 3-D TV viewing system comprising: a single image display device;
   a set of vertical and horizontal deflection circuits for displaying an image on said display device;
   a pair of spectacle devices corresponding to human eyes and comprising a light shutter that passes and shuts off light and is synchronized to an image displaying period in said display device;
   a signal distributor for discriminating a left and a right image signal from a video signal consisting of two direction image signals;
   a pair of memory devices corresponding to a left and a right image for writing into and reading out of a composite image signal transmitted from said distributor;
   a signal-selector for selecting a left or a right image signal from a composite electrical image signal inputted from each of said pair of memory devices and for sending each image to said display device;
   a synchronizing signal-separating circuit for separating an image pick-up signal which is synchronized to a vertical and a horizontal display signal;
   a timing circuit having input terminals which are operatively connected to said synchronizing signal separator and (b) said discriminator, and having output terminals which are connected to (c) said vertical deflecting circuit, (d) said horizontal deflecting circuit, (e) said pair of spectacle devices, (f) said signal distributor, (g) one of said pair of memory devices used for a left image, (h) one of said pair of memory devices used for a right image, and (i) said signal selector said timing circuit generating, from a synchronizing separating signal and a discriminating signal $P_s$, (a) a vertical-synchronously separated signal $P_v$ which is to be fed to said vertical deflecting circuit so as to multiply a sweeping frequency of said vertical deflecting circuit by m times an image pick-up frequency, wherein m is a positive integer which is greater than 1 (b) a horizontal-synchronously separated signal $P_H$ which is to be fed to said horizontal deflecting circuit so as to multiply a sweeping frequency in said horizontal deflecting circuit by m times an image pick-up frequency, (c) a trigger signal $P_D$ whose period is one m-th of an image pick-up period which is to be fed to said spectacles whereby human eyes are capable of fusing said left and right images in the time period which is twice a display period of said display device so as to obtain a stereoscopic view, (d) a composite signal $P_s'$ which is to be fed to said signal distributor so as to respectively distribute each left and right image signal to each of said pair of memory devices, (e) trigger signals each having a period the same as that of said discriminating signal to be fed to said pair of memory devices which are capable of supplying each left and right image signal m times to said signal selector, and (f) a further trigger signal whose period is one m-th of said image pick-up period which is to be fed to said signal selector so as to repeatedly display the same single left or right image m times in said single display device.

2. A 3-D TV viewing system according to claim 1, wherein each said pair of memory devices corresponding to each left and right image signal consists of two independent devices, one of said devices being exclusively used for reading into and the other of said devices being exclusively used for reading out.

3. A 3-D TV viewing system according to claims 1 or 2, wherein said vertical and horizontal sweeping frequencies are made to be a frequency twice said image pick-up frequency, and wherein a shutter period is made to be a half of the period for image pick-up, and wherein said single picked-up image is made to be twice displayed in a period corresponding to half of said image pick-up period in said display device.

* * * * *